United States Patent
Chang et al.

(10) Patent No.: US 7,865,330 B2
(45) Date of Patent: Jan. 4, 2011

(54) SYSTEM AND METHOD FOR MEASURING A CURVE OF AN OBJECT

(75) Inventors: Chih-Kuang Chang, Tu-Cheng (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/430,103

(22) Filed: Apr. 26, 2009

(65) Prior Publication Data

US 2009/0287459 A1 Nov. 19, 2009

(30) Foreign Application Priority Data

May 16, 2008 (CN) .......................... 200810301607

(51) Int. Cl.
*G01B 5/20* (2006.01)
*G01B 11/24* (2006.01)
*G01B 17/06* (2006.01)
*G01B 21/20* (2006.01)

(52) U.S. Cl. .................................... 702/167

(58) Field of Classification Search ................. 702/150, 702/155, 158, 167; 345/589, 619; 703/6, 703/7
See application file for complete search history.

(56) References Cited

U.S. PATENT DOCUMENTS

| | | | | |
|---|---|---|---|---|
| 2009/0063105 A1* | 3/2009 | Chang et al. | ................... | 703/1 |
| 2009/0112511 A1* | 4/2009 | Chang et al. | ................ | 702/167 |
| 2009/0248356 A1* | 10/2009 | Kriegmair | ................... | 702/155 |
| 2009/0289953 A1* | 11/2009 | Chang et al. | ................ | 345/619 |
| 2010/0021068 A1* | 1/2010 | Chang et al. | ................ | 382/199 |

* cited by examiner

*Primary Examiner*—Michael P Nghiem
(74) *Attorney, Agent, or Firm*—Raymond J. Chew

(57) ABSTRACT

A system and method for measuring a curve of an object includes aligning the ideal curve and the real point-cloud of the object, and defining a plurality of tolerance ranges for an area of a real curve of the object having a tolerance in a predetermined range. The method further includes determining a closest ideal point on the ideal curve corresponding to each real point in the real point-cloud, and assigning a serial number to each real point in the real point-cloud according to a sequence of the closest ideal points on the ideal curve. Furthermore, the method includes generating the real curve by connecting every two real points in the real point-cloud according to the serial number, and assigning a color to each line-segment according to the tolerance range in which two closest distances corresponding to two end-points of each line-segment fall.

17 Claims, 7 Drawing Sheets

SYSTEM AND METHOD FOR MEASURING A CURVE OF AN OBJECT

BACKGROUND

1. Technical Field

Embodiments of the present disclosure relate to the field of computer aided design (CAD) methods, and more particularly to a system and method for measuring a curve of an object.

2. Description of Related Art

In the precision measurement field, a two-dimensional (2D) measurement machine is widely used to measure the outlines of a object. Such a 2D measurement machine measures a set of plane coordinates of points on the object to generate a curve of the object based on the coordinates. The generated curve and an ideal curve defined by a CAD model of the object are compared, so as to determine a precision of the CAD model of the object. However, in one such CAD method, it is difficult to measure a curve of the object via the 2D measurement machine if the shape of the object is complicated. More importantly, if multiple objects need to be measured, inefficiency results, which wastes time and reduces productivity.

Therefore, there is a need for a system and method to overcome the aforementioned problem.

DETAILED DESCRIPTION

All of the processes described below may be embodied in, and fully automated via, function modules executed by one or more general purpose computers or processors. The code modules may be stored in any type of computer-readable medium or other computer storage device. Some or all of the methods may alternatively be embodied in specialized computer hardware.

Figure 1:
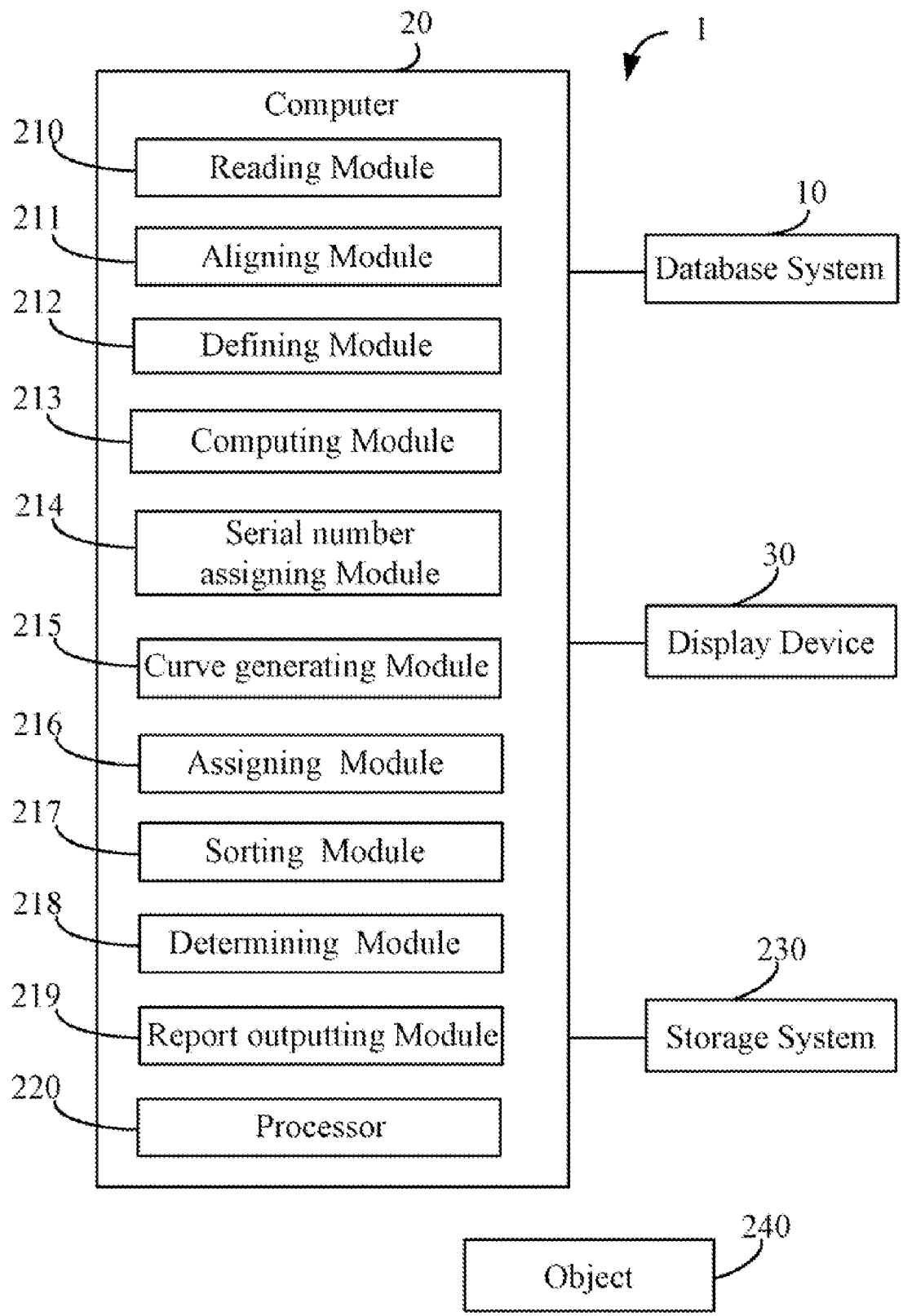
FIG. 1 is a block diagram of one embodiment of a system for measuring a curve of an object.

FIG. 1 is a block diagram of one embodiment of a system 1 for measuring a curve of an object 240. The system 1 includes a computer 20 in communication with a database system 10 and a display device 30.

The database system 10 is electronically connected to the computer 20 and stores point data representing an ideal curve of the object 240. It may be understood that the object 240 is a computer aided design (CAD) model. In one embodiment, the database system 10 stores point data regarding a real point-cloud of the object 240 scanned by a 2D scanner (not shown in FIG. 1). The stored point data comprises coordinates of each real point in the real point-cloud of the object 240. In one embodiment, the real point-cloud is a set of vertices in a two-dimensional (2D) coordinate system and may be defined by an X, Y coordinate system. The objects 240 may be, but not limited to, a component of a mobile phone.

The display device 30 displays the ideal curve, the real point-cloud of the object 240, and reports the measurement results. A user can then view the measurement results and make informed decisions based on the measurement results.

In one embodiment, the computer 20 comprises a reading module 210, an aligning module 211, a defining module 212, a computing module 213, a serial number assigning module 214, a curve generating module 215, a color assigning module 216, a sorting module 217, a determining module 218 and a report outputting module 219. The modules 210-219 may be stored in a storage system 230 and comprise one or more computerized operations that are executable by a processor 220.

The reading module 210 is operable to read point data of an ideal curve of the object 240 and point data of a real point-cloud of the object 240 from the database system 10. In one embodiment, the point data of the ideal curve point data comprises coordinates of a set of points representing the ideal curve (hereafter, "ideal points"), and the point data of the real point-cloud of the object 240 comprise coordinates of a set of points representing the real point-cloud of the object 240 (hereafter, "real points").

The aligning module 211 is operable to align the ideal curve and the real point-cloud accordingly. In one embodiment, for example, the aligning module 211 superposes the coordinate system of the ideal curve on top of the coordinate system of the real point-cloud.

The defining module 212 is operable to define a plurality of tolerance ranges for an area of a real curve of the object 240 having a tolerance in a predetermined range. A unique color is further defined by the defining module 212 for distinguishing each of the tolerance ranges. For example, a color of blue-black is assigned to a first tolerance range [−0.14 mil, −0.12 mil], a color of bright-yellow is assigned to a second tolerance range [+0.12 mil, +0.14 mil]. It is noted that, in this embodiment, tolerance values between the minimum boundary value and the maximum boundary value are regarded as allowable errors.

The computing module 213 is operable to compute a closest distance between each real point and the ideal curve, and determining a closest ideal point on the ideal curve for each real point. Further details of how to determine the closest ideal point are described with respect to FIG. 3.

The serial number assigning module 214 is operable to assign a serial number to each real point according to a sequence of the closest ideal points on the ideal curve. The serial numbers may be arranged in an alphabetical order, numerical order, an alphanumerical order, and/or a predetermined order. For example, the serial numbers may be numerals, i.e., 1, 2, 3, . . . . The serial numbers that have corresponding closest ideal points on the ideal curve are consecutive.

Figure 4:
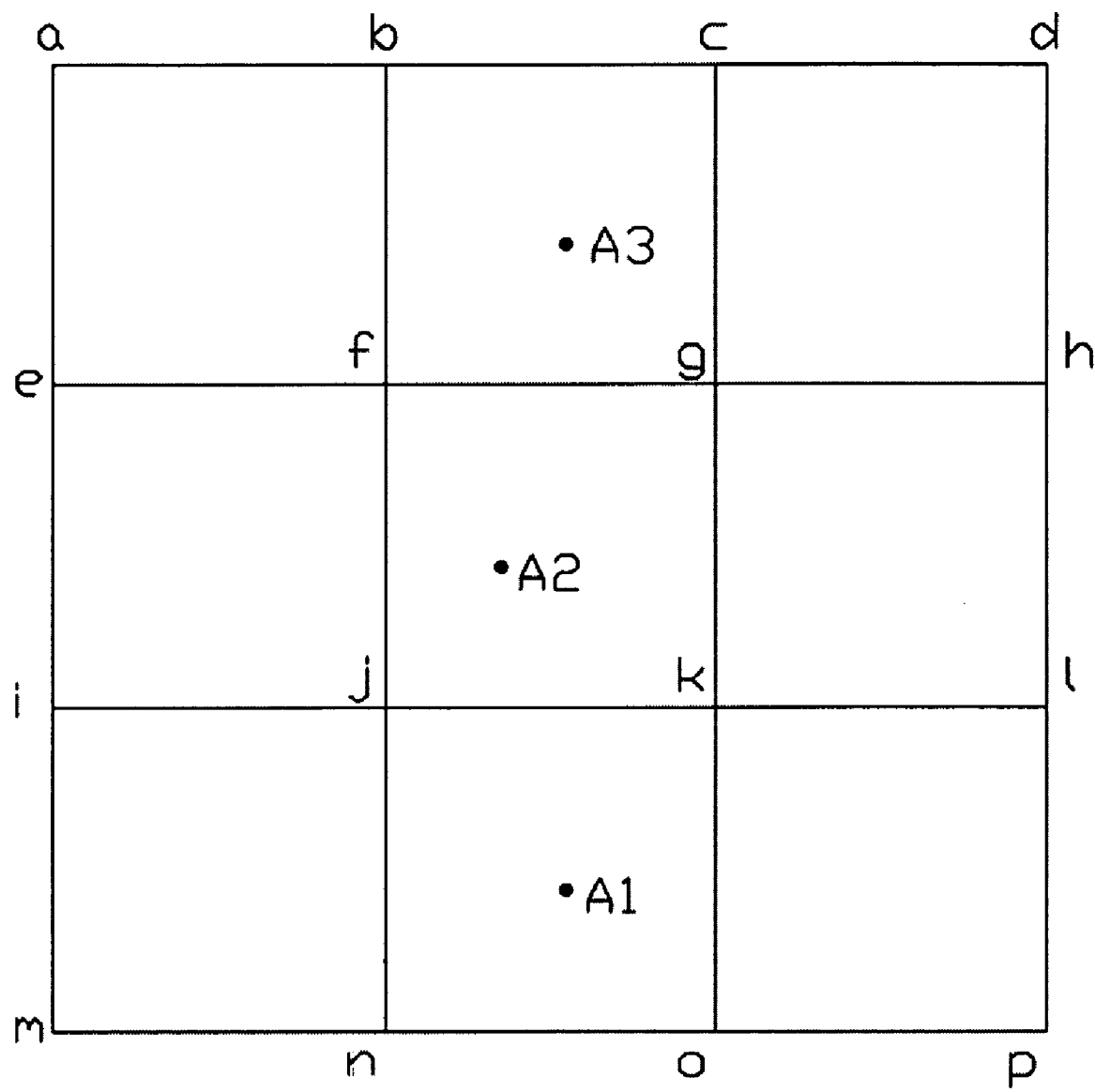
FIG. 4 illustrates one embodiment of a part of sub-bounding boxes.

The curve generating module 215 is operable to generate the real curve of the object 240 by connecting every two real points in the real point-cloud of the object 240 according to the serial numbers. FIG. 4 shows one example of a real point-cloud in a sub-bounding box comprising three points $A_1$, $A_2$ and $A_3$, where the serial number of the point $A_1$ is "1," the serial number of the point $A_2$ is "2" and the serial number of the point $A_3$ is "3." In this example, the curve generating module 215 connects the two points $A_1$ and $A_2$, and connects the two points $A_2$ and $A_3$ to generate the real curve of the object 240 according to the sequence of the serial numbers of the three points $A_1$, $A_2$ and $A_3$.

Figure 5:
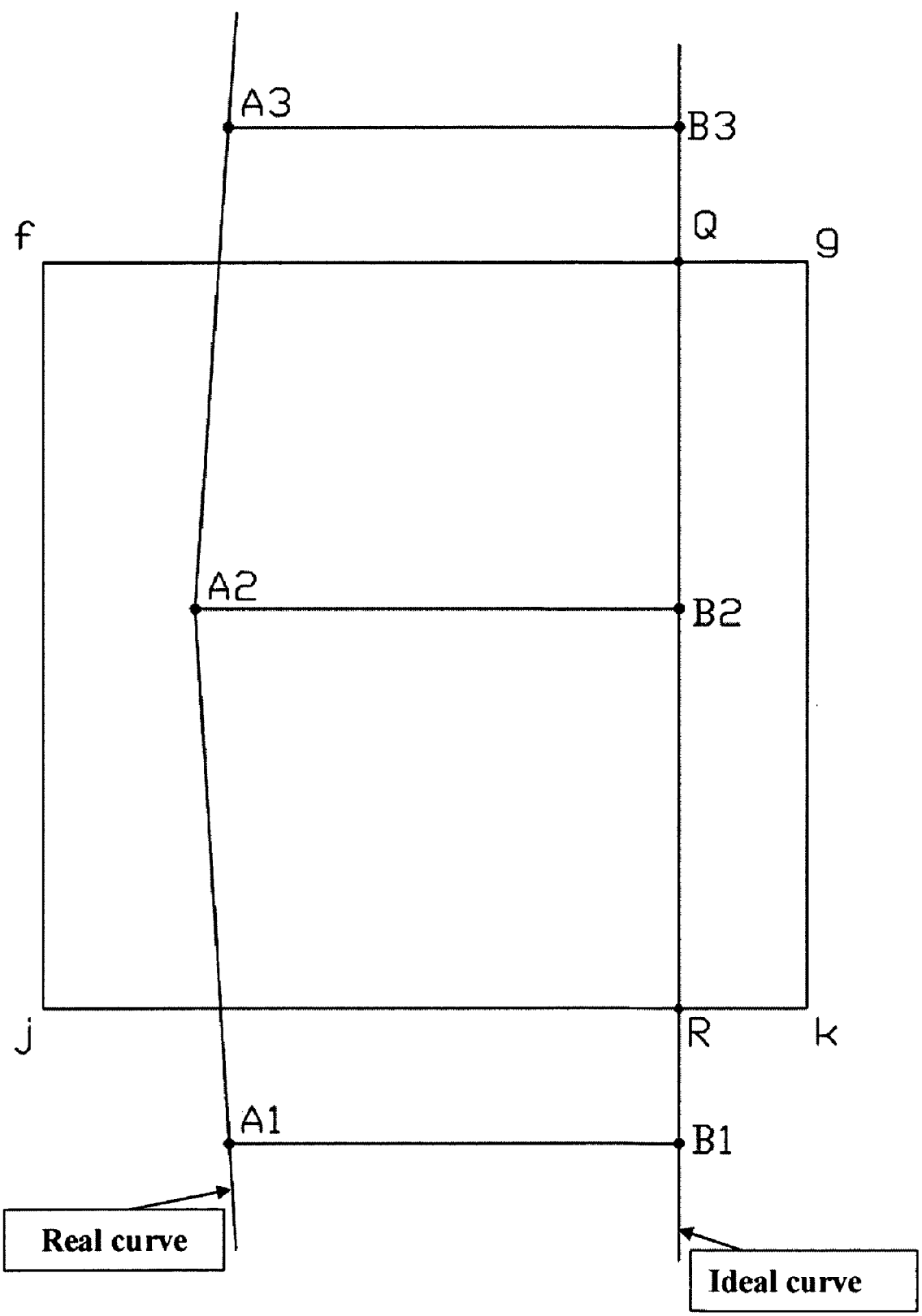
FIG. 5 illustrates one embodiment of a sub-bounding box which intersects with the ideal curve.

The color assigning module 216 is operable to assign one or two colors to each line-segment in the real curve of the object 240 according to colors assigned to the tolerance ranges in which closest distances corresponding to two end-points of each line-segment fall. FIG. 5 shows one example of assigning colors to points nearest an ideal curve in a sub-bounding box. In the illustrated embodiment of FIG. 5, a point $B_1$ on the ideal curve is a closest ideal point corresponding to the point $A_1$ in the real point-cloud, a point $B_2$ on the ideal curve is a closest ideal point corresponding to the point $A_2$ in the real point-cloud, and a point $B_3$ on the ideal curve is a closest ideal point corresponding to the point $A_3$ in the real point-cloud. If the closest distances $|A_1B_1|$ and $|A_2B_2|$ fall in the tolerance range [−0.14 mil, −0.12 mil], then the color assigning module 216 assigns the color of blue-black to the line-segment $A_1A_2$. In another particular example, if the closest distance $|A_1B_1|$ falls in the tolerance range [−0.14 mil, −0.12 mil], and the closest distance $|A_2B_2|$ falls in the tolerance [+0.12 mil, +0.14 mil], then the color assigning module 216 assigns two colors of blue-black and bright-yellow to the line-segment $A_1A_2$. As a result, a half of the line-segment $A_1A_2$ is blue-black, and another half of the line-segment $A_1A_2$ is bright-yellow.

The sorting module 217 is operable to sort the real points in the real point-cloud of the object 240 into a plurality of groups according to curvatures of the real curve. In one embodiment, the curvatures of the real curve indicate a changing trend of the real curve. The changing trend may be determined by a slope of the real curve at various points of the real curve.

The determining module 218 is operable to determine a maximum distance corresponding to a first real point and a minimum distance corresponding to a second real point in each group.

The outputting module 219 is operable to output a measuring report based on measurement results. In one embodiment, the measuring report comprises the real curve and the ideal curve, the maximum distance corresponding to a first real point and the minimum distance corresponding to a second real point in each group. Additionally, the measuring report also contains a date, a type of the object 240, and a magnification when the measuring report is outputted.

Figure 2:
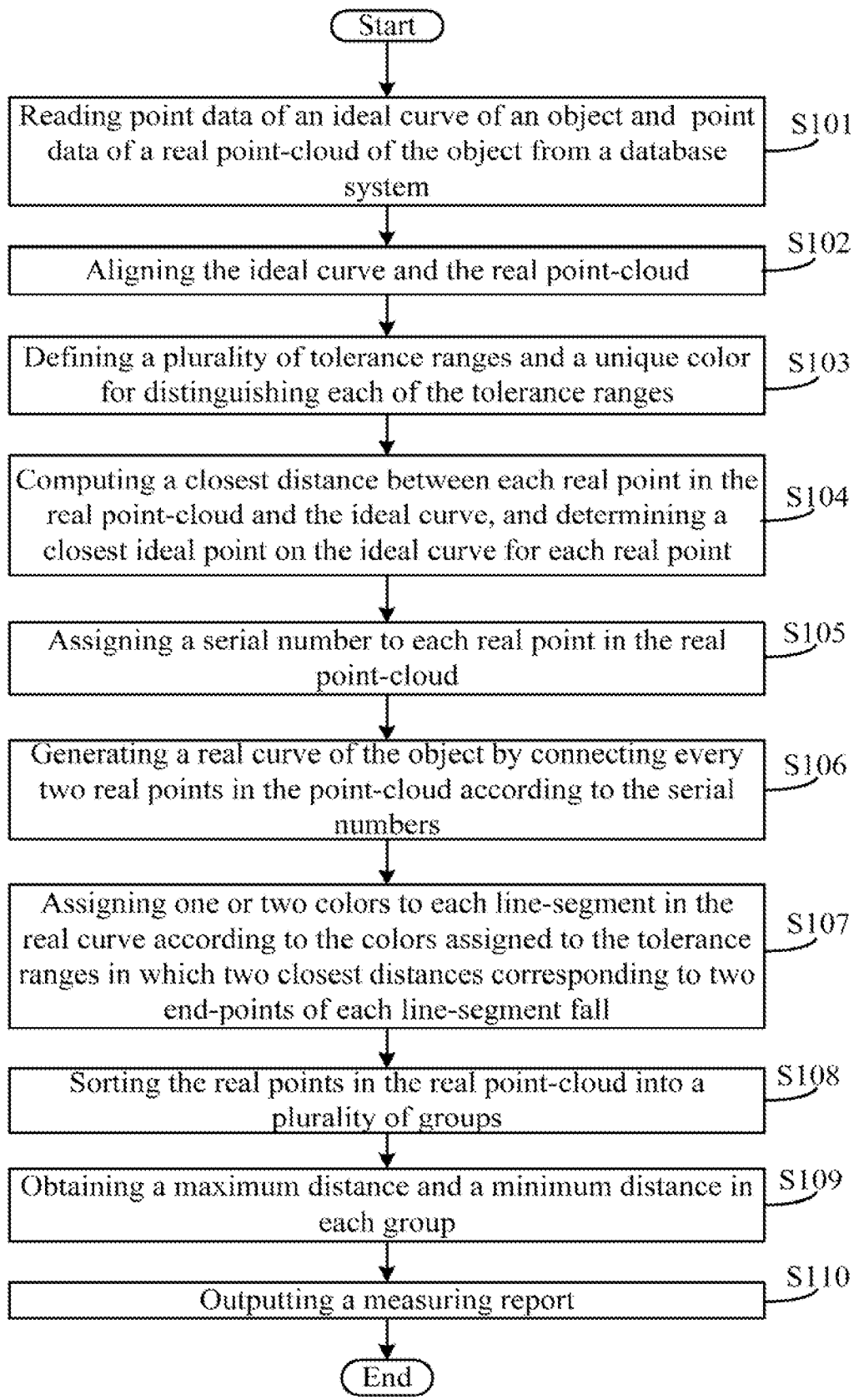
FIG. 2 is a flowchart of one embodiment of a method for measuring a curve of an object.

FIG. 2 is a flowchart of one embodiment of a method for measuring a curve of an object 240. In block S101, the reading module 210 reads point data of an ideal curve of the object 240 and point data of a real point-cloud of the object 240 from the database system 10. As mentioned above, the point data of the ideal curve include coordinates of a set of points representing the ideal curve, and the point data of the real point-cloud include coordinates of a set of points representing the real point-cloud.

In block S102, the aligning module 211 aligns the ideal curve and the real point-cloud accordingly. In one embodiment, for example, the aligning module 211 superimposes the coordinate system of the ideal curve and the coordinate system of the real point-cloud of the object 240.

In block S103, the defining module 212 defines a plurality of tolerance ranges for an area of a real curve of the object 240 having a tolerance in a predetermined range and a unique color for distinguishing each of the tolerance ranges.

In block S104, the computing module 213 computes a closest distance between each real point and the ideal curve and determines a closest ideal point on the ideal curve for each real point.

Figure 7:
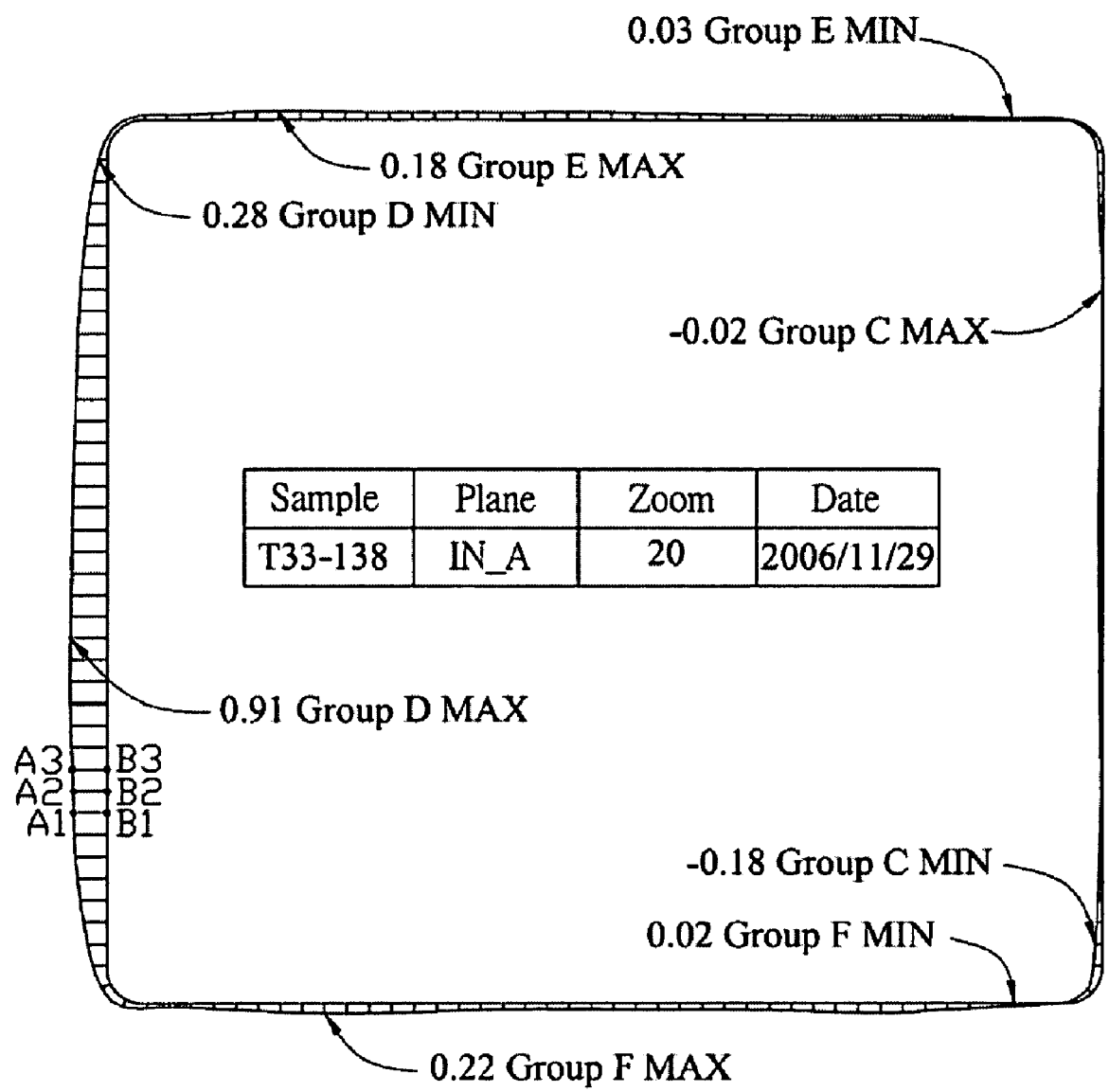
FIG. 7 illustrates one embodiment of a measuring report of the object.

In block S105, the serial number assigning module 214 assigns a serial number to each real point according to a sequence of the closest ideal points on the ideal curve. As mentioned above, the serial numbers have corresponding closest ideal points on the ideal curve in a consecutive manner. As shown in FIG. 7, in one embodiment, assuming the point $B_1$ is the closest ideal point from the real point $A_1$ to the ideal curve, the point $B_2$ is the closest ideal point from the real point $A_2$ to the ideal curve, and the point $B_3$ is the closest ideal point from the real point $A_3$ to the ideal curve, then assigning module 214 assigns a serial number to point $A_1$, $A_2$ and $A_3$ respectively according to the sequence of the closest ideal point $B_1$, $B_2$ and $B_3$ on the ideal curve.

In block S106, the curve generating module 215 generates the real curve of the object 240 by connecting every two real points in the real point-cloud according to the serial numbers. As mentioned above, if the real point-cloud contains three real points $A_1$, $A_2$ and $A_3$, where the serial number of the real point $A_1$ is "1," the serial number of the real point $A_2$ is "2" and the serial number of the real point $A_3$ is "3," then the curve generating module 215 connects the two real points $A_1$ and $A_2$, and connects the two real points $A_2$ and $A_3$ to generate the real curve of the object 240 according to the sequence of the serial numbers of the three real points $A_1$, $A_2$ and $A_3$.

In block S107, the color assigning module 216 assigns one or two colors to each line-segment of the real curve according to colors assigned to the tolerance ranges in which the closest distances corresponding to two end-points of each line-segment fall. A detailed description of one embodiment of how to assign one or two colors to each line-segment of the real curve was mentioned above.

In block S108, the sorting module 217 sorts the real points in the real point-cloud into a plurality of groups according to the serial number. In one embodiment, the curvatures of the real curve indicate the changing trend of the real curve.

In block S109, the determining module 218 determines a maximum distance corresponding to a first real point and a minimum distance corresponding to a second real point in each group. FIG. 7 illustrates one embodiment of a measuring report of the object 240. As shown in FIG. 7, the maximum distance corresponding to the first real point in group D is 0.91 mil and the minimum distance corresponding to the second real point in group D is 0.28 mil.

In block S110, the report outputting module 219 outputs a measuring report based on measurement results. In one embodiment, the measuring report comprises the real curve and the ideal curve, the maximum distance corresponding to a first real point and the minimum distance corresponding to a second real point in each group. For example, the outputting module 219 outputs a measuring report as shown in FIG. 7. Additionally, the measuring report also contains a date, a type of the object 240, and a magnification when the measuring report is outputted.

Figure 3:
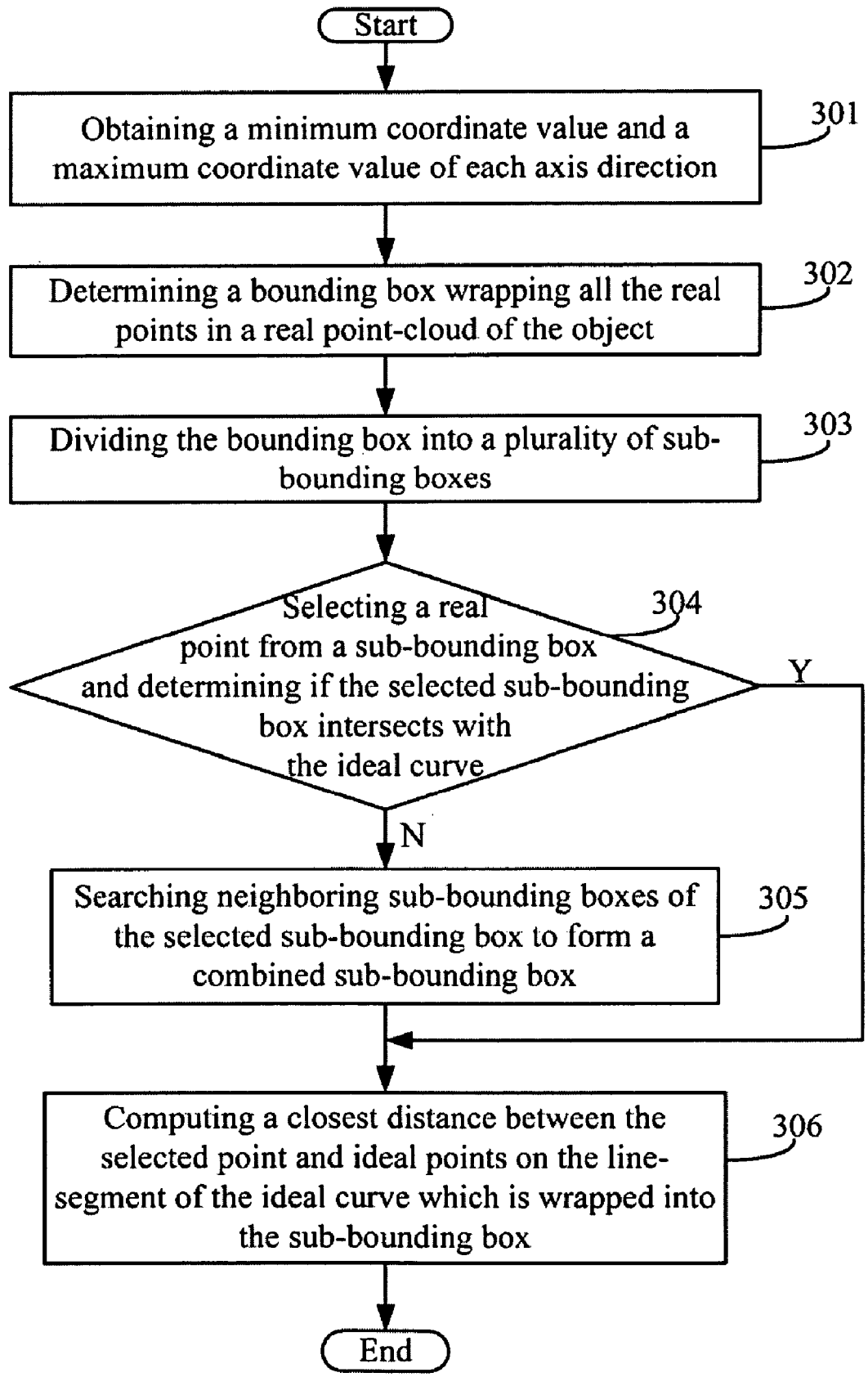
FIG. 3 is a detailed description of one block in FIG. 2 of one embodiment for computing a closest distance between an ideal curve and each real point in the real point-cloud of the object.

FIG. 3 is a detailed description of block S104 in FIG. 2 of one embodiment. In block S301, the computing module 213 determines a minimum coordinate value and a maximum coordinate value of each axis direction (e.g., X-axis and Y-axis) according to point data of the real point-cloud.

In block S302, the computing module 213 determines a bounding box that wraps all the real points according to the minimum coordinate value and the maximum coordinate value of each axis direction. It may be understood that each real point in the real point-cloud has unique 2D coordinates which may be in x, y form corresponding to the XY coordinate system. In one particular example, x_min and x_max respectively denotes the minimum coordinate value and the maximum coordinate value of the real points of X-axis, and y_min and y_max respectively denotes the minimum coordinate value and the maximum coordinate value of the real points of Y-axis. Accordingly, a bounding box wrapping all the real points may be represented by (x_min, x_max, y_min, y_max).

In block S303, the computing module 213 divides the bounding box into a plurality of sub-bounding boxes. FIG. 4 illustrates a part of sub-bounding boxes. In one example, each real point is wrapped in a sub-bounding box. The point $A_1$ is wrapped by a sub-bounding box j-k-n-o, the point $A_2$ is wrapped by a sub-bounding box f-g-j-k and the point $A_3$ is wrapped by a sub-bounding box b-c-f-g.

In block S304, the computing module 213 selects a real point from a sub-bounding box and determines if the selected sub-bounding box intersects with the ideal curve. As shown in FIG. 4, for example, assuming the computing module 213 selects the point $A_2$ from the sub-bounding box f-g-j-k and determines if the sub-bounding box f-g-j-k intersects with the ideal curve. If the selected sub-bounding box f-g-j-k intersects with the ideal curve, the procedure turns to block S306. Otherwise, if the selected sub-bounding box f-g-j-k does not intersect with the ideal curve, the procedure turns to block S305.

In block S305, the computing module 213 searches neighboring sub-bounding boxes of the selected sub-bounding box to form a combined sub-bounding box until the combined sub-bounding box intersects with the ideal curve. As shown in FIG. 5, the computing module 213 searches neighboring sub-bounding boxes of the selected sub-bounding box f-g-j-k to form a combined sub-bounding box a-d-m-p. If the sub-bounding box a-d-m-p intersects with the ideal curve, the procedure turns to block S306.

Figure 6:
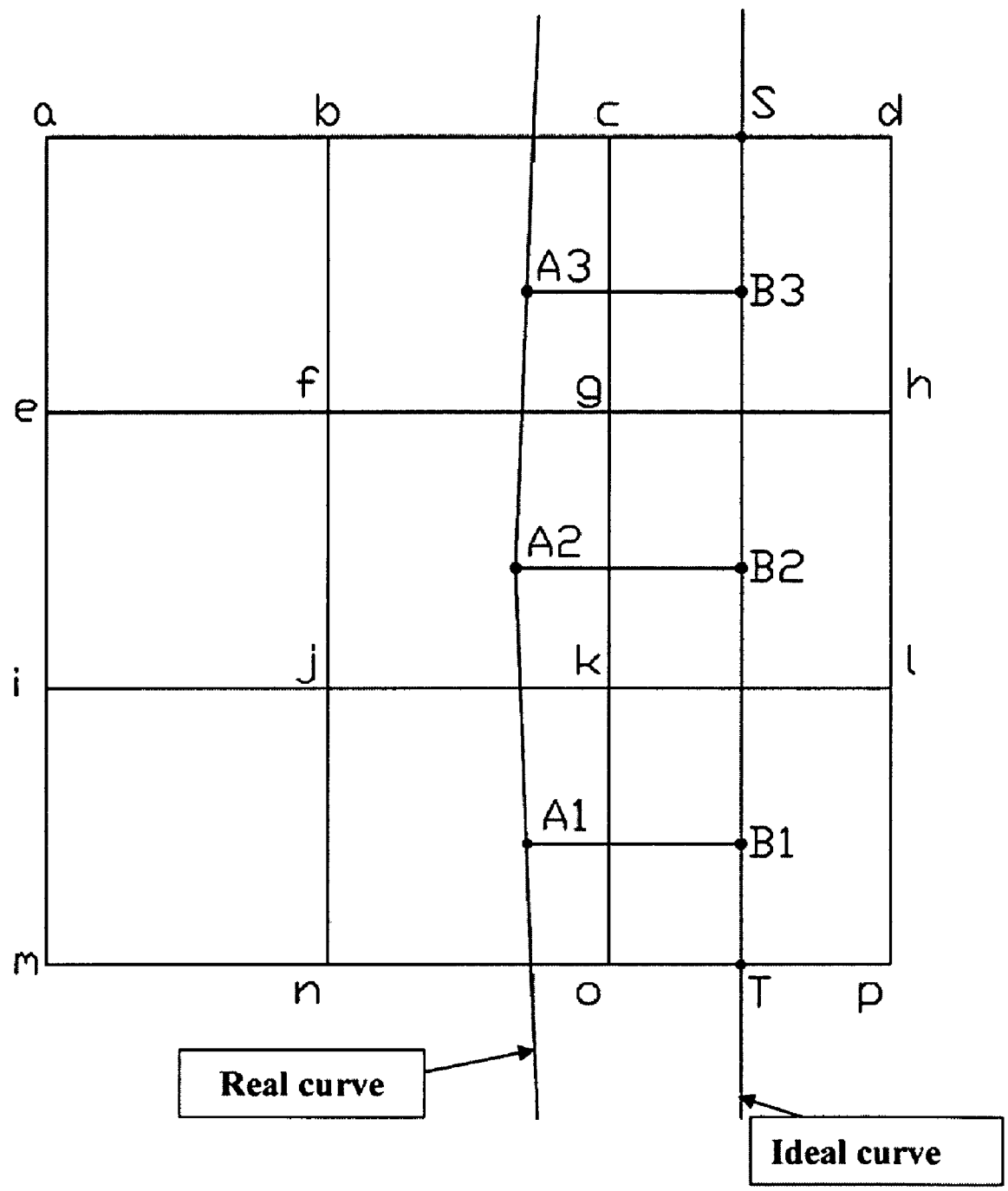
FIG. 6 illustrates one embodiment of a combined sub-bounding box which intersects with the ideal curve.

In block S306, the computing module 213 computes a closest distance between the selected real point and the ideal points on a line-segment of the ideal curve which is wrapped into the sub-bounding box. Using the formula:

$$D = \min f(x,y) = \sqrt{(x-x_0)^2 + (y-y_0)^2},$$

wherein $(x_0, y_0)$ is coordinates of a selected real point in the sub-bounding box, $(x,y)$ is coordinates of an ideal point on the line-segment of the ideal curve, and "min $f(x,y)$" is the minimum of the function "$f(x,y)$". Using the function D as mentioned above, a closest distance value is computed. In one embodiment, the sub-bounding box refers to the selected sub-bounding box if the selected sub-bounding box intersects with the ideal curve, and the sub-bounding box refers to the combined sub-bounding box if the selected sub-bounding box does not intersect with the ideal curve. In one particular example, as shown in FIG. 5, the selected sub-bounding box f-g-j-k intersects with ideal curve and the line-segment QR of the ideal curve is wrapped into the sub-bounding box, assuming $A_2(a_0, a_1)$ is a real point in the sub-bounding box, and $B_2(b_0, b_1)$ is an ideal point on line-segment QR of the ideal curve, a distance between $A_2$ and $B_2$ may be defined as $|A_2B_2| = \sqrt{(a_0-b_0)^2 + (a_1-b_1)^2}$. For any ideal point $B'_2$, wherein $B'_2$ is an ideal point in line-segment QR of the ideal curve, if a distance between $A_2$ and $B'_2$, i.e., $|A_2B'_2|$ is greater than or equal to $|A_2B_2|$, then $|A_2B_2|$ is the closest distance between the point $A_2$ and the ideal curve, and $B_2$ is the closest ideal point between the point $A_2$ and the ideal curve. In another particular example, as shown in FIG. 6, the combined sub-bounding box a-d-m-p intersects with the ideal curve and the line-segment ST of the ideal curve is wrapped into the sub-bounding box, assuming $A_2(a_0, a_1)$ is a real point in the sub-bounding box, and $B_2(b_0, b_1)$ is an ideal point on line-segment ST of the ideal curve, a distance between $A_2$ and $B_2$ may be defined as $|A_2B_2| = \sqrt{(a_0-b_0)^2 + (a_1-b_1)^2}$. For any ideal point $B'_2$, wherein $B'_2$ is an ideal point on the line-segment ST of the ideal curve, if a distance between $A_2$ and $B'_2$, i.e., $|A_2B'_2|$ is greater than or equal to $|A_2B_2|$, then $|A_2B_2|$ is the closest distance between the real point $A_2$ and the ideal curve, and $B_2$ is the closest ideal point between the point $A_2$ and the ideal curve.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for measuring a curve of an object, the system comprising a plurality of programs and a processor that executes one or more operations for the plurality of programs, the programs comprising:
    a reading module to read point data representational of an ideal curve of the object, and point data of a real point-cloud of the object from a database system;
    an aligning module to align the ideal curve and the real point-cloud accordingly using a process of superposition;
    a defining module to define a plurality of tolerance ranges of a real curve and a unique color for distinguishing each of the tolerance ranges, wherein each of the tolerance ranges represents an area of the real curve having a tolerance in a predetermined range;
    a computing module to compute a closest distance between each real point in the real point-cloud and the ideal curve, and determine a closest ideal point on the ideal curve for each real point;
    a serial number assigning module to assign a serial number to each real point in the real point-cloud according to a sequence of the closest ideal points on the ideal curve;
    a curve generating module to generate the real curve of the object by connecting every two real points in the real point-cloud according to the serial numbers; and
    a color assigning module to assign one or two colors to each line-segment of the real curve according to colors assigned to the tolerance ranges in which two closest distances, between the real curve and the ideal curve, corresponding to two end-points of each line-segment fall.

2. The system of claim 1, wherein the point data of the ideal curve comprise coordinates of each ideal point on the ideal curve, and the point data of the real point-cloud comprise coordinates of each real point in the real point-cloud.

3. The system of claim 1, further comprising a sorting module to sort the real points in the real point-cloud into a plurality of groups according to curvatures of the real curve.

4. The system of claim 3, further comprising a determining module to determine a maximum distance corresponding to a first real point and a minimum distance corresponding to a second real point in each group, wherein the maximum distance represents a maximum distance between the real points of each group and the ideal curve, and the minimum distance represents a minimum distance between the real points of each group and the ideal curve.

5. The system of claim 4, further comprising a report outputting module to output a measuring report, wherein the measuring report comprises the real curve and the ideal curve, and the maximum distance corresponding to a first real point and the minimum distance corresponding to a second real point in each group.

6. A computer-based method for measuring a curve of an object, the method comprising:

(a) reading point data representational of an ideal curve of the object, and point data of a real point-cloud of the object from a database system;
(b) aligning the ideal curve and the real point-cloud accordingly using a process of superposition;
(c) defining a plurality of tolerance ranges of a real curve and a unique color for distinguishing each of the tolerance ranges, wherein each of the tolerance ranges represents an area of the real curve having a tolerance in a predetermined range;
(d) computing, using a processor, a closest distance between each real point in the real point-cloud and the ideal curve, and determining a closest ideal point on the ideal curve for each real point;
(e) assigning a serial number to each real point in the real point-cloud according to a sequence of the closest ideal points on the ideal curve;
(f) generating the real curve of the object by connecting every two real points in the real point-cloud according to the serial numbers; and
(g) assigning one or two colors to each line-segment of the real curve according to colors assigned to the tolerance ranges in which two closest distances, between the real curve and the ideal curve, corresponding to two endpoints of each line-segment fall.

7. The method of claim 6, wherein the point data of the ideal curve comprise coordinates of each ideal point on the ideal curve, and the point data of the real point-cloud comprise coordinates of each real point in the real point-cloud.

8. The method of claim 6, wherein the step of (b) comprises:
superposing the coordinate system of the ideal curve on top of the coordinate system of the real point-cloud.

9. The method of claim 6, further comprising:
(h) sorting the real points in the real point-cloud into a plurality of groups according to curvatures of the real curve;
(i) determining a maximum distance corresponding to a first real point and a minimum closest distance corresponding to a second real point in each group, wherein the maximum distance represents a maximum distance between the real points of each group and the ideal curve, and the minimum distance represents a minimum distance between the real points of each group and the ideal curve; and
(j) outputting a measuring report, wherein the measuring report comprises the real curve and the ideal curve, and the maximum distance corresponding to a first real point and the minimum distance corresponding to a second real point in each group.

10. The method of claim 9, wherein the closest distance is computed as follows:

$$D=\min f(x,y)=\sqrt{(x-x_0)^2+(y-y_0)^2},$$

wherein $x_0$, $y_0$ is coordinates of a real point in the sub-bounding box, x, y is coordinates of an ideal point on the line-segment of the ideal curve, and "min $f(x,y)$" is the minimum of the function "$f(x,y)$".

11. The method of claim 6, wherein the step (d) comprises:
(d1) determining a minimum coordinate value and a maximum coordinate value of each axis direction according to point data of the real point-cloud;
(d2) determining a bounding box that wraps all the real points in the real point-cloud according to the minimum coordinate value and the maximum coordinate value of each axis direction;
(d3) dividing the bounding box into a plurality of sub-bounding boxes, wherein each sub-bounding box wraps one or more point in the real point-cloud;
(d4) selecting a real point from a sub-bounding box and determining if the selected sub-bounding box intersects with the ideal curve;
(d5) searching the neighboring sub-bounding boxes of the selected sub-bounding box to form a larger sub-bounding box until the larger sub-bounding box intersects with the ideal curve;
(d6) computing a closest distance between the selected real point and a segment of the ideal curve which is wrapped into the sub-bounding box; and
(d7) repeating the steps (d5)-(d6) until all the points in the real point-cloud are computed.

12. A non-transitory computer-readable medium having stored thereon instructions for that, when executed by a computer, causing the computer to perform a method for measuring a curve of an object, the method comprising:
(a) reading point data representational of an ideal curve of the object, and point data of a real point-cloud of the object from a database system;
(b) aligning the ideal curve and the real point-cloud accordingly using a process of superposition;
(c) defining a plurality of tolerance ranges of a real curve and a unique color for distinguishing each of the tolerance ranges, wherein each of the tolerance ranges represents an area of the real curve having a tolerance in a predetermined range;
(d) computing a closest distance between each real point in the real point-cloud and the ideal curve, and determining a closest ideal point on the ideal curve for each real point;
(e) assigning a serial number to each real point in the real point-cloud according to a sequence of the closest ideal points on the ideal curve;
(f) generating the real curve of the object by connecting every two real points in the real point-cloud according to the serial numbers; and
(g) assigning one or two colors to each line-segment of the real curve according to colors assigned to the tolerance ranges in which two closest distances, between the real curve and the ideal curve, corresponding to two endpoints of each line-segment fall.

13. The medium of claim 12, wherein the point data of the ideal curve comprise coordinates of each ideal point on the ideal curve, and the point data of the real point-cloud comprise coordinates of each real point in the real point-cloud.

14. The medium of claim 12, wherein the method of the step (b) comprises:
superposing the coordinate system of the ideal curve on top of the coordinate system of the real point-cloud.

15. The medium of claim 12, wherein the method further comprises:
(h) sorting the real points in the real point-cloud into a plurality of groups according to curvatures of the real curve;
(i) determining a maximum distance corresponding to a first real point and a minimum distance corresponding to a second real point in each group, wherein the maximum distance represents a maximum distance between the real points of each group and the ideal curve, and the minimum distance represents a minimum distance between the real points of each group and the ideal curve; and
(j) outputting a measuring report, wherein the measuring report comprises the real curve and the ideal curve, and the maximum distance corresponding to a first real point and the minimum distance corresponding to a second real point in each group.

16. The medium of claim 12, wherein the method of the step (d) comprises:
- (d1) determining a minimum coordinate value and a maximum coordinate value of each axis direction according to point data of the real point-cloud;
- (d2) determining a bounding box that wraps all the real points in the real point-cloud according to the minimum coordinate value and the maximum coordinate value of each axis direction;
- (d3) dividing the bounding box into a plurality of sub-bounding boxes, wherein each sub-bounding box wraps one or more real point in the real point-cloud;
- (d4) selecting a real point from a sub-bounding box and determining if the selected sub-bounding box intersects with the ideal curve;
- (d5) searching the neighboring sub-bounding boxes of the selected sub-bounding box to form a combined sub-bounding box until the combined sub-bounding box intersects with the ideal curve;
- (d6) computing a closest distance between the selected real point and the ideal points on the line-segment of the ideal curve which is wrapped into the sub-bounding box; and
- (d7) repeating the steps (d5)-(d6) until all the real points in the real point-cloud are computed.

17. The medium of claim 16, wherein the closest distance is computed as follows:

$$D = \min f(x,y) = \sqrt{(x-x_0)^2 + (y-y_0)^2},$$

wherein $x_0$, $y_0$ is coordinates of a real point in the sub-bounding box, x, y is coordinates of an ideal point on the line-segment of the ideal curve, and "$\min f(x,y)$" is the minimum of the function "$f(x,y)$".

* * * * *